Patented Nov. 30, 1943

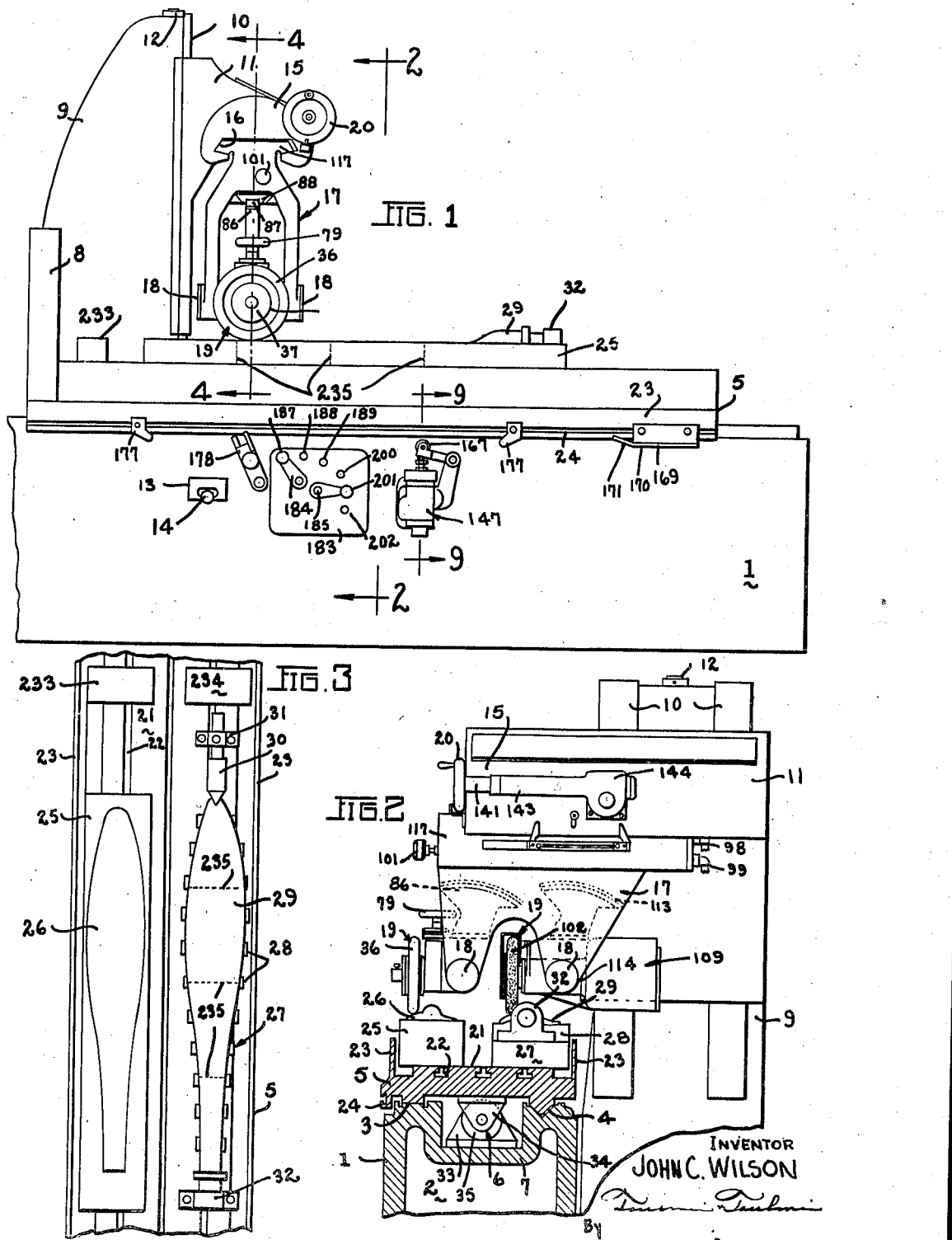

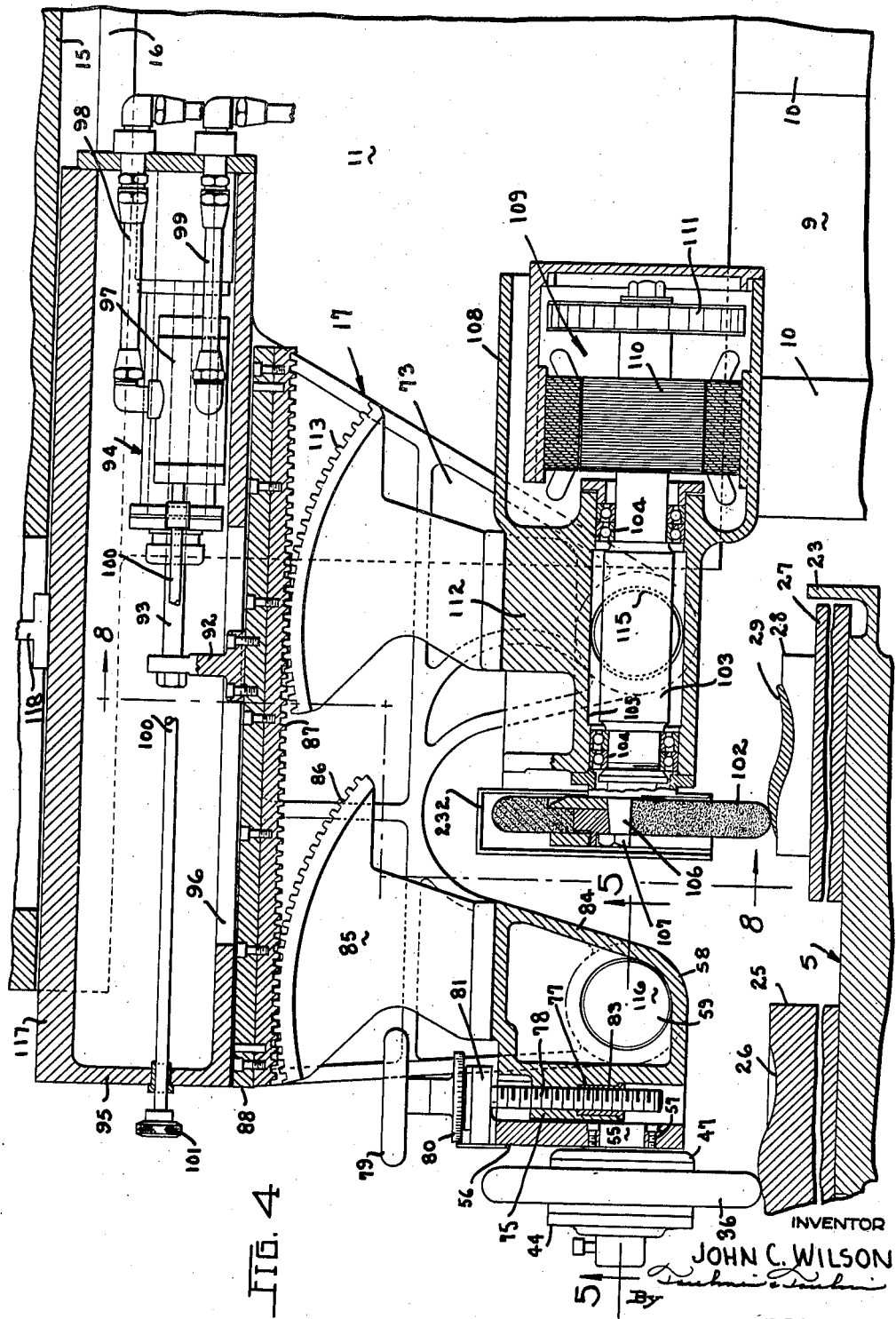

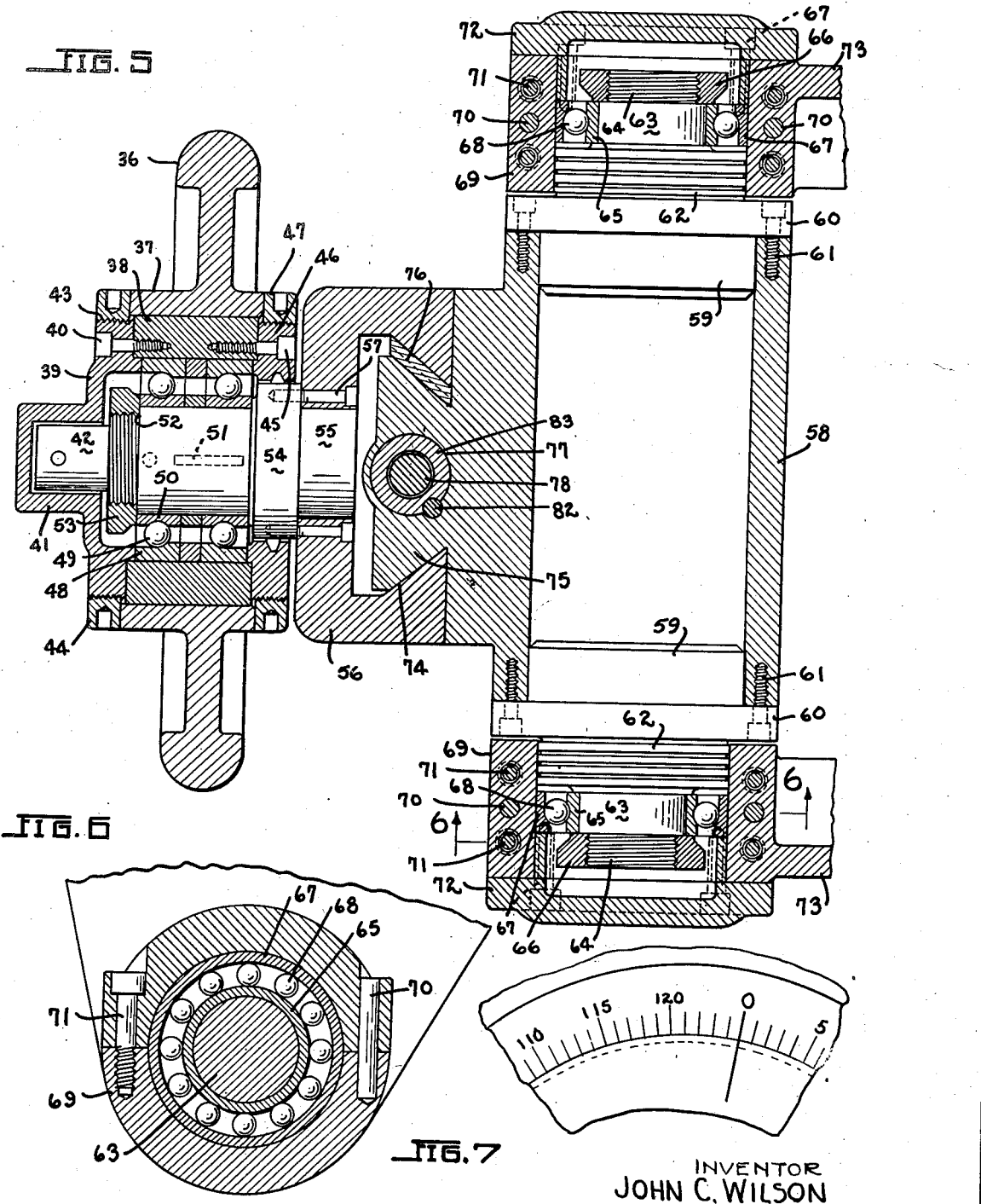

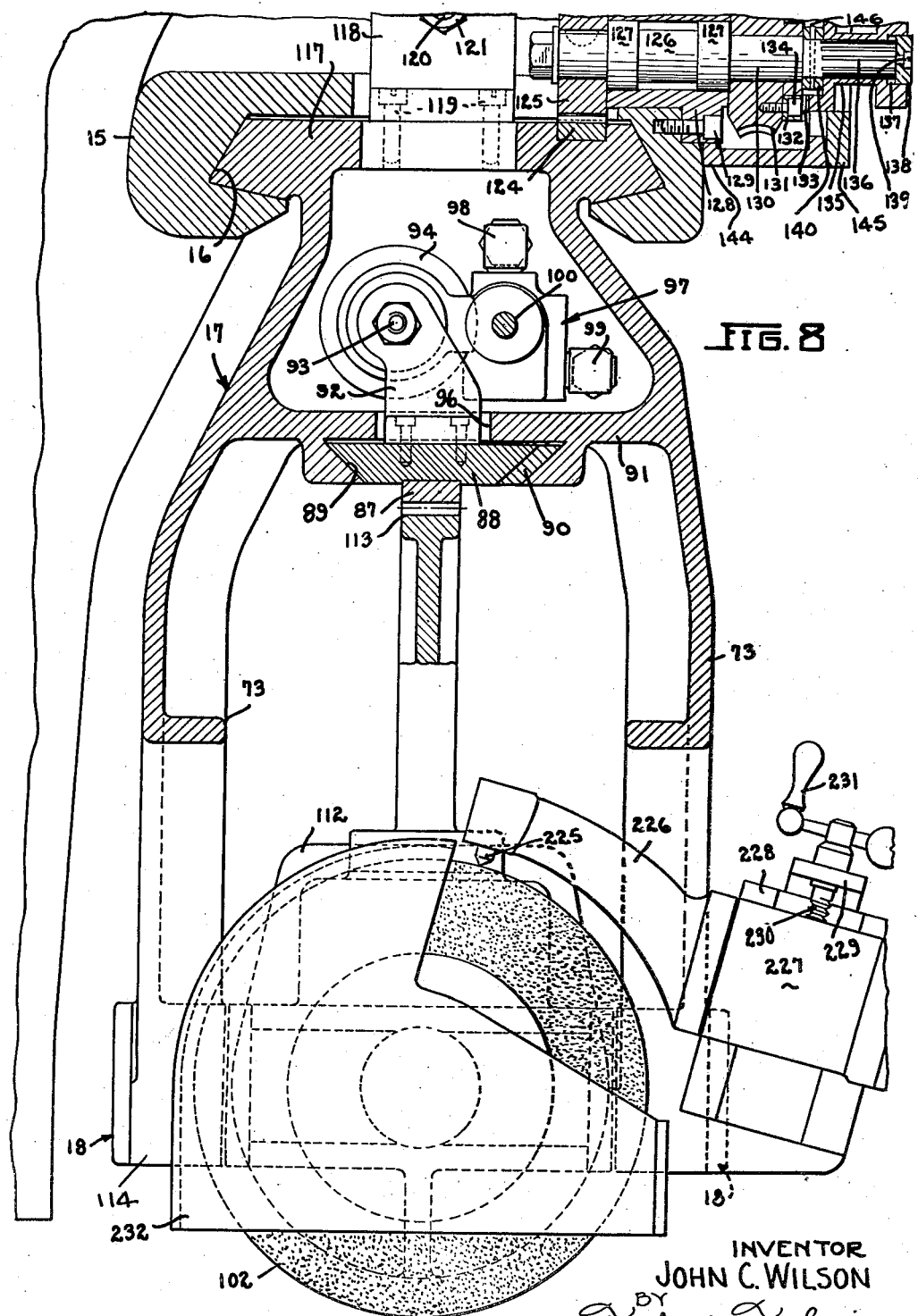

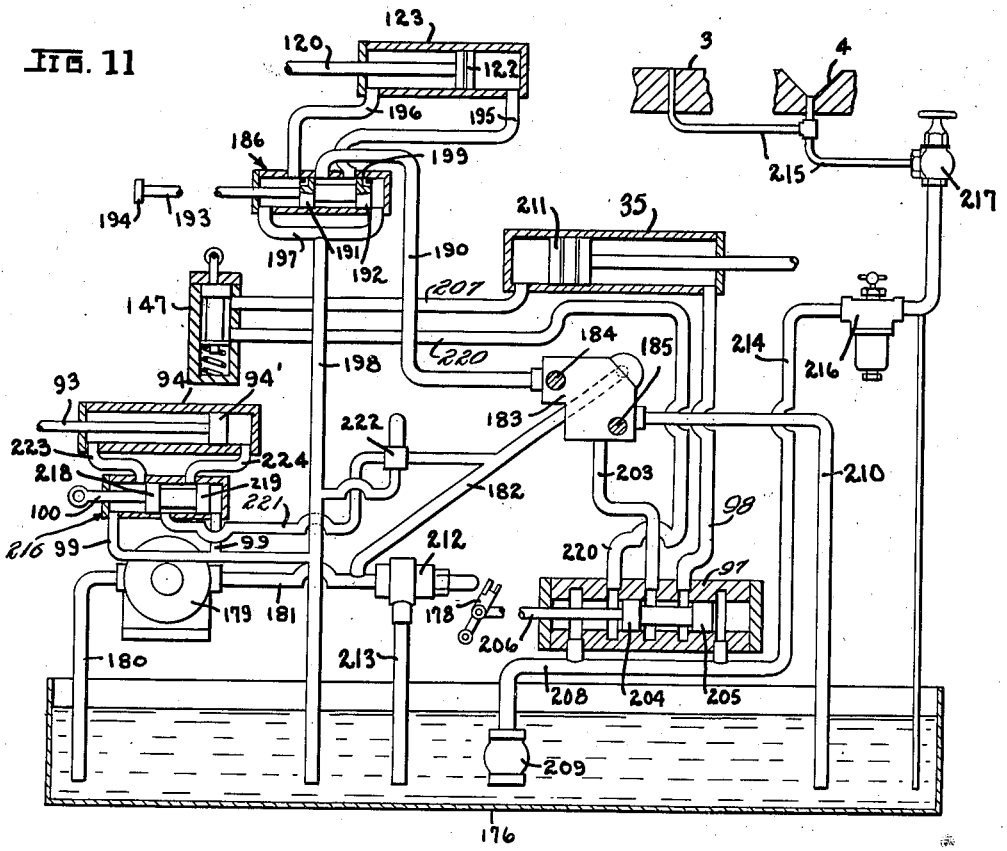
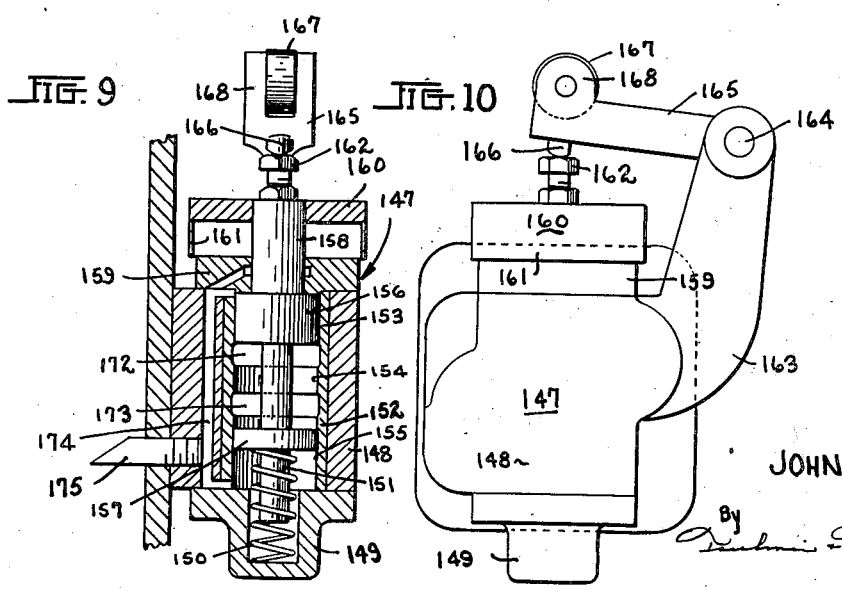

2,335,625

UNITED STATES PATENT OFFICE 2,335,625

GRINDING MACHINE

John C. Wilson, Springfield, Ohio, assignor to The Thompson Grinder Company, Springfield, Ohio, a corporation of Ohio Application March 13, 1941, Serial No. 383,189

25 Claims. (Cl. 51—100)

The present invention relates to grinding machines or other mechanism for shaping material to a predetermined form or dimension.

The primary object of the invention is to provide a machine which can fashion metal, wood or other workable material to the corresponding dimensions or form of a template or a workpiece sample. This object is attained, in brief, by providing a mechanism, including a follower, which is so arranged with respect to the template or other sample member as to cause the abrading or cutting tool to describe the same path as the follower in moving over the template.

Another object is to provide the machine referred to with a suitably controlled mechanism for applying a constant and continuous pressure between the follower and the template and yet to be able to move the follower away from the template, which in turn, causes a removal of the abrading or cutting tool away from the workpiece. As a corollary object there is provided a simple but effective mechanism for holding the follower and the abrading tool at a predetermined elevated position, permitting no movement in the vertical direction of either the follower or the abrading tool.

Still another object is to provide a machine having a follower-abrading-wheel mechanism with a device for moving the follower and the abrading wheel together toward or away from the sample or workpiece, said device also serving to move the follower independently of the abrading tool with respect to the workpiece.

Further objects are to provide a machine having an abrasive wheel pivotally mounted so as to control the height of the wheel with respect to the workpiece with an actuating motor, the motor being positioned on the opposite side of the pivot from the abrasive wheel, thus tending to relieve the workpiece of the weight of the wheel.

Another object is to provide a machine having a follower-abrasive-wheel attachment with a mechanism by which the follower may be adjusted to cause the abrasive wheel to describe a path during the abrading operation which is different from the path through which the follower moves. Thus the work turned out at the abrasive wheel may or may not be identical with the sample or workpiece, depending on these adjustments.

Still another object is to provide a machine which employs a heavy reciprocatory table in connection with a grinding wheel, or other shaping tool, and in which the table is caused to be retarded just before its return stroke, thus preventing overrun of the table. This object is attained, in brief, by providing a hydraulic motor for operating the table, and inserting in the hydraulic line of the motor a valve which is automatically throttled when the table nears its extreme position, ready to be retracted.

Another object is to provide a grinding machine with a selectively operated manual control or hydraulic control of the cross-feed, together with a simple but highly efficient mechanism for changing from the manual to the automatic control, or vice versa.

Still another object is to provide a grinding or shaping machine in which the duplicating mechanism as applied to the grinder or shaper is free from back lash, or other conditions brought about by wear and which cause inaccuracy of duplication during the grinding or cutting process. In carrying out this object the control of the follower of the duplicating mechanism is always exercised on the shaping or abrading tool in the same direction, thus offsetting the effects of back lash.

Other objects and features will be apparent as the following specification is perused in connection with the accompanying drawings.

In the drawings:

Figure 1 is an elevational view of the improved machine.

Figure 2 is an end view of a portion of the machine, parts of which are in section and taken along the line 2—2 in Figure 1.

Figure 3 shows a template on the left, and the workpiece which is to be cut to shape and dimensions of the template on the right. The figure as a whole indicates the manner in which the template is lined up with the workpiece for duplication purposes.

Figure 4 is an enlarged sectional view taken along the line 4—4 in Figure 1 to show the details of the follower and abrasive wheel, together with the mechanism by which the movements of the follower are duplicated by the movements of the abrasive wheel.

Figure 5 is an enlarged sectional view taken along the line 5—5 in Figure 4 to illustrate the details of the follower wheel bearing.

Figure 6 is a sectional view taken along the line 6—6 in Figure 5, looking in the direction of the arrows.

Figure 7 is a fragmentary view of a dial carried on the adjusting nut of the follower wheel for indicating the axial position of the follower with respect to the pivot point about which it swings.

Figure 8 is a partial sectional view taken along the line 8—8 in Figure 4, showing the end view of the grinding wheel and its reciprocating carriage together with a wheel dresser.

Figure 9 is an enlarged sectional view of the so-called retarding or slow-down valve for reducing the speed of the table at one end of its stroke. The section is taken along the line 9—9 in Figure 1.

Figure 10 is an elevational view of the structure shown in Figure 9.

Figure 11 is a diagram of an exemplary hydraulic circuit which may be employed for operating the improved shaping or grinding machine.

Referring more particularly to Figure 1, reference numeral 1 generally designates the bed of a grinding machine. The bed is hollowed out, as indicated at 2 in Figure 2, and the top of the bed is provided at one side with a flat way 3 and at the other side with a V-shaped groove or way 4. A table, generally designated 5, is adapted to reciprocate over the ways 3, 4 and is actuated by a hydraulic mechanism, generally designated 6, which is supported on a sunken platform 7 formed in the bed 1.

At the left-hand end of the bed 1 (Figure 1) there is provided a spark shield 8, which is secured to a heavy box-shaped member 9. The latter is flared outwardly from either side at its right-hand edge (Figure 1), the flared portion terminating in a pair of oppositely disposed flat tongues or slides indicated at 10. There is a heavy T-shaped member 11 having a flanged portion extending vertically, and provided with a groove which is gibbed to the vertically disposed tongues 10. There is an elevating screw 12 which passes through the vertical member 9, and is adapted to be rotated manually but preferably by an electric motor (not shown), which is controlled by a combined gear shift and switch mechanism 13. The screw 12 may be rotated to the right or left, thus moving the T-shaped member 11 upwardly or downwardly at the tongue and groove arrangement.

The member 11 is provided at each side thereof with an outwardly extending semi-circular portion, termed a "saddle" 15. This saddle is provided with a V-shaped cradle, generally designated 17, and which is provided with a tongue gibbed in any suitable manner to the groove 16. The lower end of the cradle 17 terminates in a bifurcated portion, the furcations of which carry bearings 18 about which the follower and abrasive wheel, generally indicated 19, are pivoted, as will be explained in greater detail in connection with the other figures. A hand wheel 20 is suitably secured to the saddle 15, as will be explained in connection with Figure 8, in order to move the cradle 17 with respect to the saddle at the V-shaped slide.

The table of the machine, as illustrated in Figure 2, may comprise a heavy flat plate 21 having T-shaped grooves 22 for securing the workpiece to the table. The table terminates at each edge preferably in an upstanding strip 23, and directly below one of these strips the table is provided with an underhanging ledge 24 to facilitate the attachment of certain operating dogs or levers. Along one side of the upper surface of the table and bolted thereto there is a template 25, formed of a heavy block of metal and provided at its upper surface with a portion having a contour which it is desired to copy on the workpiece. The specific shape shown is that of an airplane propeller half. The plan view of this shape in relief is indicated at 26 in Figure 3. Adjacent the template block 25, at the other side of the table, there is mounted a magnetic chuck 27 having upstanding blocks 28 on which the workpiece 29 rests (Figure 3). The workpiece takes the form of a propeller blade half similar to the portion 26 of the template. In order to rigidly maintain the workpiece 29 on the magnetic chuck it may be desirable to provide a spud 30 at one end, the spud being clamped at 31. The other end of the workpiece 29 may be inserted into an upstanding lug 32 and bolted in position.

The hydraulic mechanism 6 may consist of a cylinder 35 which is mounted at each end on a triangular-shaped upright 33, the cylinder containing the piston and a rod which is bolted or otherwise secured to a lug 34 which extends downwardly from the table 5. The arrangement is such, as will be explained in connection with Figure 11, that when pressure fluid is admitted to the cylinder 35, the piston causes the table 5 to move in one direction, and on the admission of pressure fluid to the other side of the piston the travel of the table is reversed.

*Follower wheel and head mechanism*

The details of the follower and its head are shown in Figures 4, 5 and 6. The follower wheel 36 preferably has a rounded edge to reduce wear, and is carried on a hub portion 37. There is a cylindrical member 38 contained within the hub 37 which carries at its left-hand side a cap 39, screwed as at 40 to the member. This cap is provided with a hollow cylindrical portion indicated at 41, which receives one end of a shaft 42 on which the follower 36 is adapted to rotate. The cap member 39 is threaded at its outer periphery, as indicated at 43, a ring nut 44 being screwed to these threads and adapted to bear against the left-hand surface of the hub 37. At the other end of the cylindrical member 38 there is secured, by means of the screws 45, a plate 46 having a threaded exterior surface which receives a ring nut 47. It is apparent that by loosening one of the nuts 44, 47 and tightening the other nut, the follower 36 can be moved with respect to the cylindrical member 38 either to the right or left, depending upon the adjustment made at the nuts 44, 47. In order to readily indicate the relative position of the follower 36 and the member 38, the nut 44 may carry gradations as indicated in Figure 7, preferably marked off with suitable indicia which can be translated into changes of axial position of the follower.

The cylindrical member 38 surrounds the outer portion 48 of a ball bearing race, the balls of which have been shown at 49. The inner race, indicated at 50, is secured as by a key 51 to an enlarged portion of the shaft 42. This shaft is provided with a threaded shoulder portion 52, on which is screwed a nut 53 for holding the ball race in position. The shaft 42 has an enlarged portion 54 which tapers down to a smaller portion 55, the latter being received in an opening in a box-shaped compartment member 56. The shaft is secured to this compartment in the endwise direction by means of screws 57. The compartment member 56 is in sliding contact with the flat surface formed at one side of a heavy metal cylinder 58. It is apparent that the shaft 42 is held rigidly in a stationary position by the compartment member 56, and that the follower wheel 36 is adapted to rotate about the shaft at the ball bearings and to be moved in an axial direction with respect to the compartment member 56 by means of the ring nuts 44, 47.

The cylinder 58 is hollow, and is closed at each end by means of a plug 59 which forms part of a plate 60, screwed as indicated at 61 to the edge of the cylinder. The outer surface of each plate 60 is provided with a ridged cylinder portion 62 which carries a shaft 63 of relatively small diameter, and terminating in a threaded portion 64. The inside race 65 of a ball bearing surrounds the shaft 63 and is held in position by means of a nut 66, threaded on the portion 64. The outer race 67 of the ball bearing 68 is contained within a hub portion 69 of the flanged furcations 73 forming part of the cradle 17, described in connection with Figure 1. The hub portion 69 may be formed in two sections doweled together as indicated at 70, and then screwed as indicated at 71. Cap members 72 may be screwed to the outer surface of the hub portion 69 at each end of the cylinder 58. A small space is left between the outer surface of each plate 60 and the inner surface of each hub portion 69. It is apparent that the compartment member 56 and the cylinder 58 are adapted to rotate with respect to the flanged elements 73 at the ball bearings 68, permitting the follower 36 to swing about the axis of the cylinder 58.

In order to provide for vertical movement between the compartment member 56 and the cylinder 58, a tongue and groove arrangement is employed. The member 56 is provided on its interior with a pair of oppositely disposed wedge-like surfaces 74. A tongue portion 75, secured to the cylinder 58, is adapted to slide along the surfaces 74. A gib 76 may be inserted between the tongue and groove arrangement for adjustment purposes. The tongue portion 75 is provided with a threaded opening 77 which is adapted to receive a screw 78. This screw terminates at the top in a round hand wheel 79, having a flange 80 which bears on a horizontally extending portion 81 forming part of the compartment 56. The arrangement is such that as the hand wheel 79 is rotated the screw 78 rotates within the tongue 75 to move the tongue with respect to the member 56. A sleeve 83 is threaded on the screw 78 and fits snugly within a counterbore provided in the tongue 75 for the purpose of taking up wear at this point. In order to prevent the sleeve from becoming loose by rotation, a pin 82 (Figure 5) may be driven into an opening which is contained partly in the sleeve 83 and partly in the heavy casting including the cylindrical member 58.

Extending outwardly from the cylinder 58 there is a box-like compartment 84 (Figures 4 and 8), carrying at its surface the web 85 of a segmental gear 86. This gear segment is adapted to mesh with a rack 87 which is carried on a tongue or slide member 88. The tongue 88 is adapted to slide within a wedge shaped groove 89, to which it is gibbed as indicated at 90. This groove is in a transversely extending web 91 which spans the furcations 73 of the cradle 17. About midway of the length of the tongue member 88 there is provided an upstanding lug 92 to which is bolted a rod 93, this rod terminating at its right-hand end (Figure 4) in a piston 94' contained in a hydraulic cylinder 94 (Figure 11). Suitable connections are made to the opposite sides of the piston for the admission of pressure fluid, as will be explained in connection with Figure 11. The cylinder 94 is contained in a large inclosure 95 positioned directly above the tongue 88, this inclosure being completely closed except for a slot 96 at its bottom portion and which receives the lug 92. This slot is of sufficient length to permit the lug to be moved a considerable distance in the direction of the rack.

In addition to the cylinder 94, the inclosure 95 contains a valve, generally designated 97, for controlling the admission of pressure fluid to the cylinder 94. The complete details of this valve will be explained in connection with Figure 11. A plurality of connections, of which two 98 and 99 have been shown, is taken from the valve 97 for operating purposes. The valve 97 contains a piston which can be manually actuated by a rod 100, the latter being extended through the inclosure 95 and terminating in a knob 101. The purpose of the rod 100 and its knob will be described in connection with the hydraulic system. The general arrangement is such that when pressure fluid is admitted to the cylinder 94, through the valve 97, the rod 93 is caused to move to the left, carrying with it the lug 92. The latter causes the gear segment 86 to move counter-clockwise about the central axis of the cylinder 58 which serves as a pivot. The follower 36 is therefore caused to move downwardly against the template 25.

*Abrasive wheel and head mechanism*

The abrasive wheel 102 is carried on a spindle shaft 103, which is provided at each end with ball bearings 104. The latter are housed within a cylindrical member 105 which is secured in any suitable manner between the furcations 73 of the cradle 17. The wheel 102 is secured to a tapered portion 106 of the shaft by means of a nut 107. The cylindrical member 105 is extended at the end remote from the wheel 102, and merges into a box-like housing 108 which contains a motor, generally designated 109. The armature 110 of this motor is mounted on the shaft 103, which also carries a fan 111. The arrangement is such that when electrical energy is supplied to the motor 109, the shaft 103 is rotated in order to cause rotation of the wheel 102.

The cylindrical member 105 is provided with an upright web 112, having a flat upper surface on which is mounted a segmental gear 113. This gear meshes with the teeth of the rack 87. The cylindrical member 105 is also pivotally mounted within a cylindrical housing 114, which is similar to the cylinder 58 described in connection with the follower wheel as illustrated in Figure 5. In other words, the structure of the pivot 115 is similar to the structure of the pivot 116 of the follower wheel insofar as it will permit rotation of the abrasive wheel 102 in the vertical plane, as seen in Figure 4. Further description of the pivot structure 115 appears to be unnecessary. In accordance with one of the features of this invention, the motor 109 is mounted on the shaft 103 a distance from the pivot 115, which is comparable to the distance between the abrasive wheel 102 and the pivot 115. Thus the weight of the motor substantially balances the weight of the wheel about the pivot 115. Under these circumstances all of the force which is exercised at the wheel 102 is translated into pressure between the periphery of the wheel and the workpiece 29. None of this force is required to balance the motor.

Operation of the mechanism shown in Figure 4

Assume that the table 5 has mounted thereon the template 25 directly under the follower wheel, and the workpiece 29 is held by the magnetic chuck directly under the abrasive wheel. The pressure of the fluid admitted to the cylinder 94 (which is usually about twenty pounds per square inch) will cause the lug 92 to move to the left, carrying with it the slide or tongue 88 and the rack 87. The follower wheel 36 is caused to move counter-clockwise around its pivot 116 and to bear on the template 25. In like manner the abrasive wheel 102 is given a counter-clockwise movement with respect to its pivot 115 and will be caused to bear against the workpiece 29. The pressure with which the follower 36 contacts the template may be independently adjusted by the hand wheel 79, which causes the follower to move in an approximate vertical direction either downwardly or upwardly, depending on the direction in which the hand wheel is turned.

In case the template has an irregular contour, as for example when airplane propellers are being made, the follower will be given an irregular motion in the vertical direction by the template as the latter moves under the follower. This vertical movement of the follower about its pivot is transmitted from the gear sector 86 to the rack 87, and will cause the lug 92 to move either to the right or left depending on the direction in which the follower moves. If the follower is forced upwardly by the template, the lug 92 is moved to the right against the pressure of the fluid within the cylinder 94, i. e., it momentarily overcomes that pressure so that the rack is moved to the right. The segmental gear 113 is thus caused to turn about its pivot 115, carrying with it the abrasive wheel 102 and the motor 109 so that the wheel is moved upwardly exactly the same distance and at the same time as the follower is moved. The abrasive wheel is therefore cause to trace a path which is either identical to or at least corresponds to the path through which the follower moves.

As the table 5 reaches its extreme position and is ready to return, a cross-feed mechanism is operated either by hand or by hydraulic pressure, as will be described presently, causing the follower to be moved laterally over the template a distance corresponding to the amount of cross feed. Thus on the return stroke of the table the follower contacts a different surface of the template and is moved upwardly through different distances to cause the abrasive wheel to follow a similar or corresponding path. As the table reaches its initial position the cross feed is again operated, the follower being caused successively to contact every point on the template so that the contour of the workpiece 29 ground by the abrasive wheel is identical with the shape of the template.

In case it is desired to effect certain predetermined dissimilarities of shape between the template and the workpiece, the ring nuts 44, 47, positioned on either side of the follower (Figure 5), may be rotated in such a way as to cause the follower to move either away from or toward its pivot 116, thus changing the positional relationship between the follower and the abrasive wheel with regard to their respective pivots. The amount of change of shape may be accurately gauged by the index carried on the ring nut 44, as seen in Figure 7. Certain other modifications may be introduced by manipulating the hand wheel 79 which assists in varying the pressure between the follower and the template.

The fact that there is a considerable pressure exercised by the hydraulic cylinder 94 on the follower 36 and the abrasive wheel 102 prevents the wheels from jumping in case the contour of the template or the workpiece abruptly changes. The pressure exerted by the cylinder 94 is of a constant amount, regardless of the vertical position of the follower or the abrasive wheel, and thus considerable advantage over a spring type of mechanism is afforded, which would obviously not exert the same pressure at the follower and the abrasive wheel throughout all vertical movements of the last two mentioned elements. It will also be noted that as the follower 36 moves upwardly, causing the gear sector 86 to move to the right, the pressure applied by the teeth of the gear sector on the rack 87 is always exercised on the opposite side of the teeth of the rack as the latter actuates the segmental gear 113 of the abrasive wheel attachment. Consequently, there can be no deleterious effects from back lash or other inaccuracies introduced by wear at the various teeth portions.

The cross-feed mechanism may be operated either manually or by hydraulic pressure, and the details are shown in Figure 8. The cradle 17 terminates at the top in a V-shaped tongue 117 which is adapted to slide in the V-shaped groove 16. The uppermost portion of the tongue 117 is provided at a suitable position with an upstanding T-shaped plate member 118, which may be screwed to the tongue as indicated at 119. This plate is connected to a piston rod 120 by means of a bolt 121, this rod terminating in a piston 122 which is contained in a hydraulic cylinder 123 (Figure 11). The arrangement is such that when pressure fluid is admitted to the cylinder 123, the tongue 117 is caused to move with respect to the saddle 15 at the groove 16, thus giving the entire follower and abrasive wheel attachment any desired movement across the template and the workpiece. The complete operation of the hydraulic cross-feed mechanism will be described in connection with Figure 11.

It may be desirable, on occasion, to operate the cross feed manually. For this purpose the tongue 117 is provided with a rack 124 which meshes with a spur gear 125, keyed to a shaft 126 (upper right-hand corner of Figure 8). This shaft is provided with roller bearings 127 supported within a sleeve 128 which is screwed, as indicated at 129, to the saddle 15. The shaft 126 has a shouldered portion 130 on which is loosely mounted a worm gear 131. A clutch ring 132, provided with axially extending teeth 133, is secured by screws 134 to one side of the gear 131. The teeth 133 are adapted to engage corresponding teeth provided at the left-hand end of a flanged sleeve 135, which is caused to rotate with the shaft 126 by means of splines 136 but is permitted to move axially along the shaft. The splined end of the shaft extends for a short distance beyond a counter-sunk opening 137 in the sleeve 135, and carries at its extreme right-hand end a stop plate 138 which slidably fits within the opening 137 and is screwed to the shaft as indicated at 139. There is a spacer plate 140 pinned to the shaft and positioned between the left-hand end of the sleeve 135 and the upper surface of the clutch ring 132. A rod 141 (Figure 2) is provided with worm threads at one end which mesh with the gear 131, and at the other end terminates in the hand wheel 20. This rod is preferably contained within a long casing 143, forming part of a larger casing 144 which surrounds the gear 131. The casing 144 is provided at its right-hand end (Figure 8) with a plate 145 which has an opening 146 to provide a bearing surface for the outer periphery of the sleeve 135.

Assume that the sleeve 135 has been shifted as far as it will go to the left so that the teeth of the sleeve mesh with the teeth 133 of the clutch ring. If the hand wheel 20 were turned the spur gear 131 would be caused to rotate, and through the teeth 133 the sleeve 135 would also be rotated. This rotational force is communicated to the shaft 126, through the splined end 136, causing the gear 125 to rotate and to move the tongue 117 through the rack 124. In order to disconnect the manual cross feed it is necessary only to move the sleeve 135 to the right against the stop plate 138, thus disengaging the clutch teeth 133.

Retarding valve attachment

When the table 5 constitutes a heavy element and is caused to move at considerable speeds, the stress imposed on the reciprocating parts at the moment of reversal of the table may become excessive. For that reason it is desirable to slow down or to retard the movement of the table just before the latter reaches the end of its stroke. In accordance with another feature of this invention, there is provided a slow-down valve which is controlled by the movement of the table. This valve is generally designated 147 in Figure 1. The details of the valve will be explained in connection with Figures 9 and 10, but the general arrangement is such that when the table has reached a predetermined point in its travel, the valve becomes operative to either reduce the supply of pressure fluid to the cylinder which moves the table, or to prevent the escape of fluid from the exhaust side of the cylinder. The operating circuits for the valve will be described in connection with Figure 11.

The valve itself comprises a box-shaped housing 148 (Figure 9), which may be secured to the bed 1 of the machine. The housing is closed at one end by means of a cap-shaped member 149, containing a compression spring 150 which surrounds an actuating rod 151. Within the housing 148 there is a circular sleeve 152 of hardened metal, this sleeve being provided at positions throughout its length with shouldered portions 153, 154 and 155, respectively. The rod 151 is provided with a pair of enlarged portions 156 and 157, respectively, these portions having diameters such as tightly to fit the shouldered portions 153 and 155, respectively. The portion 156 is extended upwardly into a rod 158 which passes through an opening in a plate 159 secured to the upper surface of the housing 148. The upper end of the rod slidably fits in an opening in a plate 160 having a downwardly extending circular lip 161, and which constitutes a cap secured in any suitable manner to the plate 159.

The rod 158 is provided with an upwardly extending member which terminates in a nut 162. An arm 163 branches out integrally from the housing 148, and carries at its upper end a stationary pivot member 164. A lever 165 is swivelly mounted at the pivot 164, the lever at the opposite end of the pivot being provided with a pin 166 which is adapted to bear against the nut 162 when the lever is forced downwardly. The latter is also provided with a roller 167, rotatably mounted within a bifurcated portion 168 of the lever. For swinging the lever 165 about its pivot in order to press downwardly on the rod 151 against the action of the spring 150, there is provided a retarding cam 169 (Figure 1) secured in any suitable manner to the table at the underhanging ledge 24. This cam has a horizontal portion 170 and a relatively short inclined portion 171. The valve 147 is so positioned on the bed of the machine that as the table 5 moves to the left from the position shown in Figure 1, the beveled portion 171 of the cam 169 contacts the roller 167 and maintains the roller in a depressed position throughout the lower horizontal portion of the cam. Thus the rod 151 is caused to move downwardly, bringing the enlarged portion 156 closer and closer to the shoulder 154, and on occasion may actually cause the enlarged portion 156 to contact the shoulder 154.

Assuming that the fluid which actuates the hydraulic table-operating mechanism 6 is caused to flow between the space 172 directly below the enlarged portion 156, and the space 173 directly below the shoulder 154, it is apparent that a downward movement of the enlarged portion 156 will cause a throttling effect on the pressure fluid. If the portion 156 begins to enter the shouldered bore portion 154, the spaces 172 and 173 are completely disconnected, which would prevent any movement of pressure fluid through the valve. Under these circumstances the hydraulic mechanism 6 is no longer actuated by pressure fluid, and thus the table slowly comes to a halt. On the other hand, as the table moves on its return travel to such a distance that the cam 169 no longer bears against the roller 167, the spring 150 forces the enlarged portion 156 upwardly to permit complete communication between the inlet and outlet spaces 172, 173. If desired, a drainage conduit 174 may be provided from a position just above the enlarged portion 156 and just below the enlarged portion 157, the drainage passageway 174 being connected to a short piece of pipe 175 (Fig. 9). While the retarding valve 147 serves to slow down the movement of the table 5 as it approaches the end of its stroke, additional means is employed for actually stopping the table at the end of its stroke and reversing its direction. This means may comprise a pair of suitably positioned dogs 177 (Figure 1), secured to one side of the table at such positions as to strike a pivoted table-reversing lever 178 which controls the valve of the table-operating cylinder, as will be explained in connection with Figure 11.

While the cam 169 has been described in connection with the retarding valve 147 as serving to slow down the table at the end of its stroke, this cam element may be used for an entirely different function. In connection with certain kinds of templates or sample workpieces, the contour of the template or sample may change abruptly. For example, some forms of airplane propeller halves terminate at one end in a cylindrical portion, calling for an abrupt change in thickness of the propeller from the flat to the cylindrical end of the member. It is apparent that if the speed of the table were maintained constant, notwithstanding an abrupt change in the contour of the workpiece, the cutting or abrading tool might tend to bite into the metal and possibly to sheer away from the enlarged portion of the workpiece. Thus, inaccuracies of the duplicating process would be introduced. Again, if the follower wheel were abruptly moving from an enlarged portion of the template to a flattened portion, it is entirely possible that the follower might attempt to jump from one portion to the other, if the speed of the table were not decreased at this point. Consequently, the cam 169 may be mounted anywhere along the length of the table, and so positioned as to slow down the movement of the table when the grinding wheel or the follower reaches any abrupt change in the contour of the workpiece or the template. If necessary, several cams 169 may be employed, of which one cam is so positioned as to slow down the table at the end of its stroke, and one or more of the remaining cams may momentarily decrease the speed of the table at predetermined positions along its travel, depending on the form of the work being done.

In order to assure accuracy in the duplication of the template shape on the workpiece, it is desirable that the diameter of the grinding wheel 102 shall be approximately the same as that of the follower wheel so that the shafts 103 and 55 are normally positioned horizontally. The wear on the wheel 102 may be compensated for, at least to some extent, by adjustment at the hand wheel 79.

*Hydraulic circuit*

The main pump for operating the improved machine is indicated at 179. This pump has a low pressure conduit 180 projecting into the tank 176 containing a fluid, such as oil. The high pressure side of the pump is taken through conduits 181, 182 to a master valve 183. This valve may be of the type which is described in my Patent No. 2,068,529, granted on January 19, 1937. From the valve there emerge two levers 184 and 185 (Figure 1), the lever 184 serving to control the character of the feed of the pressure fluid to the valve 186 of the cross-feed cylinder 123. The other lever 185 is adapted to control the supply of pressure fluid to the four-way valve 97, which controls the table-operating cylinder 35. The lever 184 is provided with three positions, namely, intermittent feed, as indicated at 187, stoppage of feed (i. e., neutral) 188, and a continuous feed indicated at 189. Suitable connections are made within the valve to bring about these results, and inasmuch as the details of the valve form no part of the present invention further description thereof appears unnecessary.

From the master valve 183 pressure fluid is conducted through a conduit 190 to a position about midway of the control valve 186. The latter is provided with a double-acting valve stem which includes a pair of pistons 191 and 192. This valve stem is extended by the rod 193 to a knob 194 for manual control. There is a high pressure conduit 195 connected between a position to the right of the piston 122 in the cross-feed cylinder 123 and a position in the valve 186 between the conduit 190 and the piston 192. A low pressure conduit 196 is connected between a position on the cross-feed cylinder 123, opposite the conduit 195, to a position in the valve 186 on the left-hand side of the piston 191. Exhaust ports 197 lead from the extreme ends of the valve 186 to an exhaust conduit 198 which leads into the tank 176.

Assume that the lever 184 has been rotated to its left-hand position (Figure 1) so as to introduce an intermittent feed of high pressure fluid into the conduit 190. This fluid will pass through the valve 186 and finally through the conduit 195, into the cylinder 123 to the right of the piston 122. The latter will then be caused to move to the left, this motion being communicated to the entire follower and abrasive wheel attachment by the T-shaped plate member 118 (Figure 4). The rate at which pressure fluid is admitted to the conduit 190 is such that the piston 122 is moved to the left only when the table 5 has reached the end of its stroke. On the other hand, if the lever 184 were moved to position 189, the conduit 190 would be continuously supplied with high pressure fluid, causing a continuous movement of the piston 122 and a continuous operation of the cross-feed mechanism. After the piston 122 has moved through its maximum distance to the left, thus giving a maximum cross-feed movement, a reverse cross-feed actuation can be introduced by shifting the pistons 191, 192 of the valve 186 to the left in order that the high pressure conduit 199 will be in communication with the conduit 196, which previously had served as the exhaust conduit.

In case it were desired to remove all pressure fluid from both sides of the piston 122, the pistons 191, 192 are given a limited movement to the left so as to coincide exactly with the conduits 196 and 195, respectively. Under these circumstances, high pressure fluid from the conduit 190 is prevented from reaching either of the conduits 195, 196, but instead the fluid in the cylinder 123 on both sides of its piston is brought into communication with the exhaust ports 197 through small angular openings 199 formed in the pistons 191 and 192. It is therefore evident that by moving the lever 184 (Figure 1) to any one of its three positions, and by controlling the positions of the pistons 191, 192 in the valve 186, full control may be exercised over the rate at which pressure fluid is admitted to the cross-feed cylinder 123 and the direction in which the piston 122 of the cylinder is caused to move.

The table control lever 185 also has three positions, these positions being indicated at 200, 201 and 202, the position 200 constituting the intermittent feed, the position 201 being the stop or neutral position and the position 202 constituting the so-called unloading position. Assume that the lever 185 has been placed at the position 200 (intermittent feed), in which case high pressure fluid is supplied from the conduit 182 to a conduit 203 leading to a central position of the control valve 97. This valve includes two pistons 204, 205 mounted on a stem 206, the latter being connected to the table-reversing lever 178. The high pressure hydraulic connection 98 is taken from the valve 97 to one end of the table-operating cylinder 35. The exhaust hydraulic connection 220 is taken from the valve on the opposite side of the high pressure conduit 203 from the connection 98 to the lower side of the retarding valve 147. The conduit 220 is in communication with the space 173 of the valve 147 (see Figure 9). A conduit 207 is connected between the space 172 of the valve 147 and the nearest end of the cylinder 35. An exhaust pipe 208 is in communication with the space in the valve 97 beyond the outer surfaces of the pistons 204, 205. This pipe terminates in a so-called foot valve 209 which is positioned below the level of the fluid in the tank 176. An exhaust conduit 210 is connected to the master valve 183 and under certain conditions, as will be explained presently, can be connected to the high pressure conduit 203.

Assume that the lever 185 has been moved to the position 200 (Figure 1). Under these conditions pressure fluid from the conduit 182 passes through the valve 183, into the conduit 203, and passes through the valve 97 into the connection 98 to the right-hand side of the piston 211 in the cylinder 35. The piston will be caused to move to the left (Figure 11), carrying with it the table 5 to which it is connected. At the same time fluid to the left of the piston is exhausted through the conduit 207, through the retarding valve 147 and the conduit 220, and finally through the valve 97 to the exhaust pipe 208. It is apparent that if the valve 147 is in the throttled position, as for example when the roller 167 (Figure 1) is depressed by the cam 169, the exhaust fluid passing through the conduit 207 is reduced. Thus the fluid to the left of the piston 211 either slows down or completely prevents further movement of the piston, and this operation preferably takes place just before the table reaches the end of its stroke. When the lever 185 is moved to position 201, high pressure fluid is prevented from reaching the conduit 203 so that the piston 211 remains in its last position. Further movement of the lever 185 to position 202 places the conduit 203 in communication with the exhaust conduit 210 to exhaust the fluid contained in the cylinder 35 at the right of the piston.

When the table has reached its extreme position the reversing lever 178 operates to move the valve stem 206 to the left, which permits pressure fluid to be supplied to the connection 220, whereas the other connection 221 is in communication with the exhaust line 208. Under these conditions, retarding valve 147 is in series with the high pressure side of the hydraulic line but serves, as before, to throttle or entirely cut off the pressure fluid transmitted to the cylinder 35 when the table has reached the end of its complete double stroke. As a protection of the hydraulic circuit, a relief valve 212 may be connected to the high pressure conduit 182 for exhausting fluid through the pipe 213 when the pressure becomes excessive. It may be desirable to lubricate the ways 3, 4 of the bed, and this may be conveniently accomplished by connecting a pipe 214 to the exhaust pipe 208 through which fluid at fairly low pressure may be passed to the pipes 215 connected to the ways. A filter 216 and a shut-off valve 217 may be inserted in the pipe 214.

The hydraulic mechanism for maintaining a constant pressure at the follower and abrasive wheels is shown to the left of Figure 11. The piston 94', which is connected through the rod 93 to the tongue 88, is controlled by a valve 216'. The valve rod 100 is provided with two portions of larger diameter 218, 219, and the ends of the valve are exhausted through the pipes 99. High pressure fluid is conducted from the conduit 182, through a relief valve 222 and a conduit 221 to a position between the portions 218, 219 of the valve rod. Connections are taken through the conduits 223 and 224 to the opposite ends of the cylinder 94. When the valve rod is in the position shown, pressure fluid is caused to flow through the valve and into the conduit 224 to the right-hand side of the piston 94'. This fluid has a constant pressure and is continuous, because the pipe 221 is connected to the high pressure pipe 182 before the fluid reaches the master valve 183. Thus a constant pressure is applied to the piston 94' which continually urges the follower 36 and the abrasive wheel 102 against the template and workpiece, respectively. When it is desired to raise the follower and the abrasive wheel, the valve rod 100 is moved to the right, permitting fluid pressure to be passed through the valve to the left of the piston 94', while the fluid on the other side of the piston is connected to exhaust. Under these conditions, pressure fluid will be employed to lift the follower and the grinding wheel through any desired angle about their respective pivots 116, 115.

*Tool dresser attachment*

This attachment is shown at the bottom of Figure 8, and comprises a diamond tool 225 which bears against the wheel and is mounted on an arcuate arm 226. An arm is carried on a shaft (not shown) which is contained in a circular barrel 227 and journalled in ball bearings. The shaft is extended through the barrel, and terminates in a bar (not shown) which may be swung to cause the arm 226 to rotate about the axis of the barrel 227. The latter is provided at each end with an overhanging portion containing a V-shaped groove (not shown). The barrel 227 is adapted to slide at the grooves over a tongue 228, which has V-shaped portions corresponding to the shape of the grooves. A strap 229 is secured to the tongue element and overhangs the barrel so as to receive screw 230, which is adapted to be operated by a hand wheel 231. Thus by rotating the hand wheel the barrel 227 can be moved with respect to the tongue element to cause the dresser tool to bear against the periphery of the abrasive wheel and simultaneously the shaft within the barrel 227 can be rotated to cause the diamond point 225 to follow the contour of the wheel. A guard 232, made of sheet metal, may be provided on each side of the wheel, the guard leaving exposed enough portions of the wheel so as to perform the pressing operation and to permit the wheel to contact the workpiece.

In making the preliminary adjustment as to the proper heights of the follower and abrasive wheels, blocks 233 and 234 (Figure 3) may be employed, these blocks having the same height by which to align the follower and the abrasive wheel. In order to align the workpiece with the template, index lines 235 may be made at corresponding positions along the workpiece and template.

While I have described my invention more especially in connection with an abrasive or grinding wheel 102 and also in connection with a ferrous metal propeller which may be secured in position by a magnetic chuck, it will be understood that the invention is not limited to these features. If desired, a shaping tool either for metal or wood may be substituted for the grinding wheel, in which case the motor 109 would be replaced by a counterweight. The workpiece 29 may be constituted of any kind of workable metal, magnetic or otherwise, or may be formed of wood, plastic or any other workable material.

It will be understood that I desire to comprehend within this invention such modifications as come within the scope of the claims and the invention.

Having thus fully described my invention, what I claim as new and desire to secure by Letters Patent is:

1. A machine for cutting material to template shape, said machine comprising a cutting tool presented to the material and a follower adapted to move over and contact with a template, said tool and follower being carried on rotatable supports which are provided with teeth, and a rack for engaging said teeth whereby as the follower is moved in response to a change in shape of the template the cutting tool is caused to change its position with respect to the machine in accordance with the changes in position of the follower.

2. A machine for grinding a workpiece to template form, said machine comprising a grinding wheel and a follower mounted respectively on rotatable supports, means for continuously urging the follower against the surface of the template whereby its support is rotated as the follower is moved over the template, and means for communicating the rotary movement of the follower support to the support of the grinding wheel whereby the wheel is caused to move in a path which corresponds to the path through which the follower moves and is held against the workpiece by the same means which holds the follower against the template, said last-mentioned means comprising a hydraulic cylinder.

3. A machine for grinding a workpiece to template form, said machine comprising a grinding wheel and a follower mounted respectively on rotatable supports, means for continuously urging the follower against the surface of the template whereby its support is rotated as the follower is moved over the template, means for communicating the rotary movement of the follower support to the support of the grinding wheel whereby the wheel is caused to move in a path which corresponds to the path through which the follower moves and is held against the workpiece by the same means which holds the follower against the template, said last-mentioned means comprising a hydraulic cylinder, and means for controlling the force exerted by the cylinder on the follower and grinding wheel supports whereby as this force is decreased the follower and wheel may be removed from the template and workpiece respectively.

4. A machine for cutting material to template shape, said machine comprising a cutting tool presented to the material and a follower adapted to move over and contact with a template, said tool and follower being carried on rotatable supports which are provided with teeth, a rack for engaging said teeth whereby as the follower is moved in response to a change in shape of the template the cutting tool is caused to change its position with respect to the machine in accordance with the changes in position of the follower, and means for moving said rack in a direction along the length of the rack in order to provide a cross-feed motion in common for the follower and the cutting tool.

5. A machine for cutting material to template shape, said machine comprising a cutting tool presented to the material and a follower adapted to move over and contact with a template, said tool and follower being carried on rotatable supports which are provided with teeth, a rack for engaging said teeth whereby as the follower is moved in response to a change in shape of the template the cutting tool is caused to change its position with respect to the machine in accordance with the changes in position of the follower, and means for moving said rack in a direction along the length of the rack in order to provide a cross-feed motion in common for the follower and the cutting tool, said last-mentioned means comprising a hydraulic cylinder containing a piston which is actuated by the application of fluid pressure thereto and a connecting rod between said piston and said rack.

6. A machine for cutting a workpiece to template form, said machine comprising a cutting tool adapted to bear against the workpiece and a follower adapted to bear against the template, said workpiece and template being secured to a reciprocable table, said follower and tool being rotatably mounted on spaced pivoted supports in order to follow the contour of the template and workpiece respectively as the table is reciprocated, means for causing the tool support to move in synchronism with the follower support around their respective pivots, and means for moving the follower with respect to the tool in the direction of the line of pivots in order to control the degree with which the movements of the follower around its pivot are duplicated by the movements of the tool around its pivot.

7. A machine for cutting a workpiece to template form, said machine comprising a cutting tool adapted to bear against the workpiece and a follower adapted to bear against the template, said workpiece and template being secured to a reciprocable table, said follower and tool being rotatably mounted on spaced pivoted supports in order to follow the contour of the template and workpiece respectively as the table is reciprocated, and means for causing the tool support to move in synchronism with the follower support around their respective pivots, said means comprising teeth carried by each of said supports and adapted to engage a common rack whereby as the follower support is moved to accommodate a difference in template contour the cutting tool support is similarly moved through the gear-rack structure.

8. A machine for cutting a workpiece to template form, said machine comprising a cutting tool adapted to bear against the workpiece and a follower adapted to bear against the template, said workpiece and template being secured to a reciprocable table, said follower and tool being rotatably mounted on spaced pivoted supports in order to follow the contour of the template and workpiece respectively as the table is reciprocated, means for moving the follower in a direction at right angles to the direction of the table and around the follower pivot in order to adjust the position of the follower with respect to the template, and means for causing the tool support to move in synchronism with the follower support around their respective pivots.

9. A machine for grinding a workpiece to template form, said machine comprising a grinding wheel which bears against the workpiece and a follower which bears against the template, said wheel and follower being swingably mounted on a pair of parallelly aligned supports which are adapted simultaneously to swing crosswise of the machine, means including hydraulic mechanism for intermittently moving said supports in a cross-feed direction and for maintaining a given cross-feed position of said supports after they have been moved to said position, and means for moving the workpiece and template in a longitudinal direction under the grinding wheel and follower respectively.

10. A machine for grinding a workpiece to template form, said machine comprising a grinding wheel which bears against the workpiece and a follower which bears against the template, said wheel and follower being swingably mounted on a pair of parallelly aligned supports which are adapted simultaneously to swing crosswise of the machine, means for moving the workpiece and template under the grinding wheel and follower respectively along the length of the machine, and a combined automatic hydraulic and hand-operated means for moving the support which carries the grinding wheel and follower in a cross-feed direction, said hydraulic and hand-operated means being selectively operable.

11. A machine for grinding a workpiece to template form, said machine comprising a grinding wheel which bears against the workpiece and a follower which bears against the template, said wheel and follower being swingably mounted on a pair of parallelly aligned supports which are adapted simultaneously to swing crosswise of the machine, said support carrying a rack meshing with a worm gear which is adapted to be rotated by a hand wheel, said support also being connected through a rod to a piston contained within a hydraulic cylinder by which the support can be moved crosswise of the machine when pressure fluid is introduced to said cylinder, means for disconnecting and connecting the rack-worm gear structure for the hand-operation of the cross feed, and means for moving the template and workpiece under the follower and grinding wheel respectively lengthwise of the machine.

12. A machine for grinding a workpiece to template form, said machine comprising a grinding wheel and a follower mounted respectively on spaced pivotal supports, an actuating motor for the grinding wheel, said motor being mounted on the opposite side of the grinding wheel pivotal support from the grinding wheel in order to balance the weight of the wheel, and means for communicating the rotary movement of the follower support to the support of the grinding wheel whereby the wheel is caused to move in a path which corresponds to the path through which the follower moves.

13. A machine for grinding a workpiece to template form, said machine comprising a grinding wheel adapted to bear against and abrade the workpiece and a follower wheel adapted to bear against the template, said grinding wheel and said follower wheel being mounted on pivoted supports in which the line of the pivots is substantially parallel to a plane taken through the workpiece and template, said pivoted supports being mechanically interconnected so as to cause the grinding wheel to move in sympathy with the follower wheel in a direction at right angles to the line of the pivots.

14. A machine for grinding a workpiece to template form, said machine comprising a grinding wheel adapted to bear against and abrade the workpiece and a follower wheel adapted to bear against the template, said grinding wheel and said follower wheel being mounted on pivoted supports in which the line of the pivots is substantially parallel to a plane taken through the workpiece and template, said pivoted supports being mechanically interconnected so as to cause the grinding wheel to move in sympathy with the follower wheel in a direction at right angles to the line of the pivots, and means for moving the follower wheel in the direction of the line of pivots and with respect to the grinding wheel.

15. A machine for grinding a workpiece to template form, said machine comprising a grinding wheel adapted to bear against and abrade the workpiece and a follower wheel adapted to bear against the template, said grinding wheel and said follower wheel being mounted on pivoted supports in which the line of the pivots is substantially parallel to a plane taken through the workpiece and template, said pivoted supports being mechanically interconnected so as to cause the grinding wheel to move in sympathy with the follower wheel in a direction at right angles to the line of the pivots, and means for moving the follower wheel in a direction at right angles to the line of pivots.

16. A machine for grinding a workpiece to template form, said machine comprising a reciprocable table on which the workpiece and template rest, a grinding wheel and a follower mounted over the workpiece and template respectively, means for reciprocating the table to cause the workpiece and template to pass under the grinding wheel and workpiece respectively, and means for automatically retarding the motion of the table when an abrupt change in the contour of the template is passing under the follower.

17. A machine for grinding a workpiece to template form, said machine comprising a reciprocable table on which the workpiece and template rest, a grinding wheel and a follower wheel mounted over the table and in contact respectively with the workpiece and template, means including a hydraulic cylinder for reciprocating the table to cause the workpiece and template to move with respect to the grinding wheel and follower wheel respectively, means for automatically retarding the motion of the table when the follower wheel detects an abrupt change in the contour of the template, said last-mentioned means comprising a valve through which pressure fluid which actuates said hydraulic cylinder passes, and means for throttling the valve at the moment the follower wheel detects an abrupt change in the contour of the template.

18. A machine for grinding a workpiece to template form, said machine comprising a reciprocable table on which the workpiece and template rest, a grinding wheel and a follower wheel mounted over the table and in contact respectively with the workpiece and template, means including a hydraulic cylinder for moving the table with respect to the follower wheel and grinding wheel in order to cause the follower to trace the contour of the template and the grinding wheel to grind the workpiece in accordance with the movements of the follower wheel, said hydraulic cylinder containing a piston to one side of which pressure fluid is admitted and from the other side of which pressure fluid is released in order to permit the piston to move and thereby to actuate the table, and means including a valve connected in the exhaust side of said hydraulic cylinder for automatically throttling the release of the pressure fluid when an abrupt change in the contour of the template is passing under the follower wheel whereby the movement of the table is momentarily retarded.

19. In a template grinding machine, a pivoted follower, a pivoted grinder, separate segmental racks on said follower and said grinding means to permit them to be actuated about their respective pivots, a common rack means engaging both of said racks, and means actuating said common rack in such manner that the pressure exerted by the teeth of the common rack is always on the same side of the teeth of each segmental rack during actuation.

20. In a template grinding machine, a pivoted follower, a pivoted grinder, separate segmental racks on said follower and said grinding means to permit them to be actuated about their respective pivots, a common rack means engaging both of said racks, means actuating said first-mentioned common rack in such manner that the pressure exerted by the common teeth of the rack is always on the same side of the teeth of each segmental rack during actuation, and means for reciprocating a workpiece and template simultaneously with the transverse movement of the follower and the grinding means.

21. In combination, means to reciprocate a template and a workpiece, means for transversely moving across said template and workpiece respectively, a follower and a grinding wheel, means for permitting said follower to freely rotate, means for bodily pivoting said follower at right angles to its axis of rotation, and means for bodily pivoting said grinding wheel at right angles to its axis of rotation.

22. In combination, means to reciprocate a template and a workpiece, means for transversely moving across said template and workpiece respectively, a follower and a grinding wheel, means for permitting said follower to freely rotate, means for bodily pivoting said follower at right angles to its axis of rotation, means for bodily pivoting said grinding wheel at right angles to its axis of rotation, means for driving said grinding wheel independently of the position about its pivot, a segmental rack mechanism associated respectively with the follower wheel and grinding wheel, a common actuator for moving each of said rack mechanisms at least in one direction, and an independent adjusting means for regulating the vertical position of the follower.

23. In a template follower machine, the combination of an independently pivoted follower and independently pivoted workpiece grinder, a common support therefor, independent actuating means for each of said follower and grinder, and a common actuator for said independent actuating means.

24. In a template follower machine, the combination of an independently pivoted follower and independently pivoted workpiece grinder, a common support therefor, independent actuating means for each of said follower and grinder, and a common actuator for said independent actuating means, said independent actuators comprising segmental racks and the common actuator comprising a straight rack.

25. In a template follower machine, the combination of an independently pivoted follower and independently pivoted workpiece grinder, a common support therefor, independent actuating means for each of said follower and grinder, a common actuator for said independent actuating means, and hydraulically actuated means for actuating said common rack at least in one direction.

JOHN C. WILSON.